UNITED STATES PATENT OFFICE 2,419,865

CARBALKOXYLATION OF PHENYL-ACETATES

Arthur W. Weston and Walter H. Hoffman, Waukegan, Ill., assignors to Abbott Laboratories, Inc., North Chicago, Ill., a corporation of Illinois No Drawing. Application July 31, 1944, Serial No. 547,518

2 Claims. (Cl. 260—475)

This invention relates to the introduction of carbalkoxy groups into organic compounds. More specifically it relates to the introduction of carbalkoxy groups into esters of phenylacetic acid with formation of esters of phenylmalonic acid. The process may also be used for the preparation of alkali metal derivatives of phenylmalonic acids which are intermediates in the process. The compounds have the general formula:

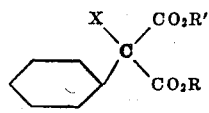

where R and R' are alkyl groups and X is hydrogen or an alkali metal. The compounds are useful intermediates in the preparation of acids and esters used in organic syntheses and of substituted barbituric acids used as medicinals.

As an example of one of the uses of a product which may be produced by the process of the invention, the diethyl ester of phenylmalonic acid having the formula:

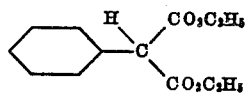

can be converted by known methods first to phenylethylmalonic ester having the formula:

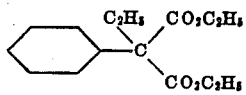

and then by condensation with urea to phenobarbital having the formula:

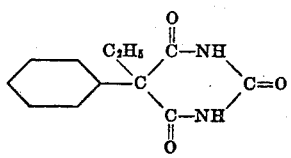

The esters of substituted malonic acids have been previously prepared by several processes but the process of this invention affords a considerable saving in cost of materials, labor, and equipment.

In the case of the product above mentioned, a phenylacetic ester (preferably the ethyl ester since it is the most readily available), is united with a large excess of a dialkyl carbonate (preferably the ethyl ester). The mixture is heated to a temperature definitely below the boiling point of any original ingredient and substantially above the boiling point of the alcohol generated by the reaction, in an apparatus provided with facilities for vigorous stirring, and for exclusion of moisture. The alkali metal is added in small pieces from time to time. Sodium reacts with the esters, liberating hydrogen and an alcohol, both of which are immediately removed from the reaction mixture in gaseous form. Active stirring is advantageous to avoid reduction of part of the phenylacetic ester to phenylethyl alcohol. The non-volatilized product is a mixture of the alkali metal derivative of phenylmalonic ester and unreacted diethyl carbonate. This may be treated with an alkyl halide to produce a disubstituted malonic ester, or with a dilute aqueous solution of an acid to give a mixture of a phenylmalonic ester and diethyl carbonate which may be separated into its components by fractional distillation. The general reaction may be illustrated by the following equation:

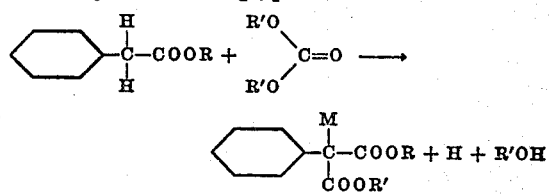

where R and R' are alkyl groups and M is an alkali metal.

An illustrative procedure which has yielded good results is as follows:

*Example*

In a one (1) liter flask equipped with an efficient agitator and fractionating column and exit for volatile products, place 300 cc. of diethyl carbonate and 82 gm. of ethyl phenylacetate. Heat the mixture to 115° C. and add gradually 12 gm. of metallic sodium cut into small pieces. Vigorous stirring should be continued and the temperature of the mixture maintained between 115° and 120° C. The reaction is definitely exothermic but not violent. Heat control by merely reducing the external heat supply while adding the sodium, is not difficult.

Alcohol is generated and is flashed out as rapidly as it forms, along with the gaseous hydrogen. The addition of the sodium requires about 1½ to 2 hours and the heating is continued for about one hour after all of the sodium has been added. The excess diethyl carbonate is removed by distillation. Diethyl carbonate boils at 126°, but a convenient procedure is to keep the temperature only about 115° C. and apply a moderate vacuum until the residue is dry. The residue is cooled, and then agitated along with a slurry of 500 gm. of ice and 52 cc. of 35% hydrochloric acid. The mass separates itself into a bottom layer of water containing salt and a little of the diethyl ester of phenylmalonic acid, and the bulk of the ester above the water. The layers are separated and the aqueous layer extracted with benzene and the extract added to the ester already separated. This combined mass is dried with sodium sulfate. Purification of the dried material by fractional distillation gave a yield of 107 gm. (89% theoretical) of diethyl ester of phenylmalonic acid.

Instead of treating the sodium derivatives of phenylmalonic ester with ice and hydrochloric acid it can, (without isolation while still in solution in diethyl carbonate), be treated directly with ethyl bromide or diethyl sulfate to produce the phenyl ethyl derivative of diethyl malonic ester. This has a boiling point much higher than diethyl carbonate so that separation is quick and easy as follows:

1. Filter out the sodium bromide or sulfate;
2. Heat to distill off the diethyl carbonate;
3. Heat to a higher temperature and distill off the desired phenyl derivative of diethyl malonic ester, leaving a slight residue of impurities.

The product thus prepared is suitable for treatment with urea and an alkali metal alcoholate to produce phenylethyl barbituric acid.

Without further elaboration the foregoing will so fully explain our invention that others may readily adapt the same for use under various conditions of service. It will, for instance, be obvious that the benzene nucleus in ethyl phenylacetate may be replaced by nuclei containing more than one ring such as naphthalene, anthracene, phenanthrene, etc. One or more hydrogen atoms attached to the carbon atoms of these rings may be replaced by groups which will not react with alkali metals under the conditions mentioned in the example, and among such groups are alkyl, aryl, alkoxy, and aryloxy, alkythio, and arylthio. Any of these rings may have the double bonds reduced. For example, the benzene ring could be replaced by the corresponding reduced ring known as cyclohexyl. It will also be obvious that where the final product is a solid or has too low a vapor pressure for convenient distillation, the final purification may be by crystallization from any suitable organic solvent.

We claim:

1. In the process of adding a carbalkoxy group to ethyl phenylacetate, the improvement which comprises reacting a mixture of ethyl phenylacetate in an excess of diethyl carbonate with sodium at a temperature of about 115°–120° C.

2. In the process of adding a carbalkoxy group to a phenylacetate ester, the improvement which comprises reacting a mixture of a phenylacetic ester in an excess of dialkyl carbonate with an alkali metal.

ARTHUR W. WESTON.
WALTER H. HOFFMAN.

REFERENCES CITED

The following references are of record in the file of this patent:

UNITED STATES PATENTS

| Number | Name | Date |
| --- | --- | --- |
| 2,346,059 | Wallingford et al. | Apr. 4, 1944 |
| 2,351,085 | Wallingford et al. | June 13, 1944 |
| 2,358,768 | Wallingford et al. | Sept. 19, 1944 |
| 2,367,632 | Wallingford et al. | Jan. 16, 1945 |

OTHER REFERENCES

Lux, "Ber der Deutschen Chem. Ges.," vol. 62 (1929), pp. 1824–27.